(12) United States Patent
Maruyama et al.

(10) Patent No.: US 7,234,229 B2
(45) Date of Patent: Jun. 26, 2007

(54) METHOD AND APPARATUS FOR MANUFACTURING MOTOR COIL

(75) Inventors: Jiro Maruyama, Tokyo (JP); Motoyuki Fujiwara, Tokyo (JP); Nobuyuki Mabuchi, Tokyo (JP); Koji Etoh, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/551,433

(22) PCT Filed: Apr. 2, 2004

(86) PCT No.: PCT/JP2004/004865

§ 371 (c)(1),
(2), (4) Date: Sep. 29, 2005

(87) PCT Pub. No.: WO2004/091074

PCT Pub. Date: Oct. 21, 2004

(65) Prior Publication Data

US 2006/0179644 A1   Aug. 17, 2006

(30) Foreign Application Priority Data

Apr. 8, 2003   (JP) ............................. 2003-103807

(51) Int. Cl.
*H01F 7/06* (2006.01)

(52) U.S. Cl. .................. 29/606; 29/602.1; 29/605; 29/729; 29/732; 29/739; 29/841; 29/856; 83/29; 83/35; 83/36; 83/50; 156/89.11; 156/89.12; 336/176; 336/200; 336/229; 427/117; 427/119; 427/120

(58) Field of Classification Search ............... 29/602.1, 29/605, 606, 729, 732, 739, 749, 761, 841, 29/856, 858, 883; 83/29, 35, 36, 50; 100/214; 156/89.11, 89.12, 250; 164/34; 249/63; 336/176, 200, 229; 427/117–120
See application file for complete search history.

(56) References Cited

U.S. PATENT DOCUMENTS

| | | | |
|---|---|---|---|
| 3,829,720 A * | 8/1974 | Swanke et al. ............... 310/43 |
| 4,942,323 A * | 7/1990 | DeCesare .................... 310/208 |
| 5,592,731 A * | 1/1997 | Huang et al. ................. 29/596 |
| 6,167,610 B1 * | 1/2001 | Nakahara et al. ............. 29/596 |
| 2005/0046538 A1 | 3/2005 | Maruyama |

FOREIGN PATENT DOCUMENTS

| JP | 52-103602 | 8/1977 |
|---|---|---|
| JP | 7-163100 | 6/1995 |

* cited by examiner

*Primary Examiner*—Paul D. Kim
(74) *Attorney, Agent, or Firm*—Smith, Gambrell & Russell LLP

(57) ABSTRACT

The present invention provides a process and an apparatus for the preparation of a motor coil by which a longitudinally wound motor coil, so called, can be easily prepared. First, a molded product 10 comprising a column part 11, and a fin part 12 projected in the form of flat plate from an outer peripheral surface 11A, 11B, 11C, 11D of the column part to an outer side in a radial direction of the column part and helically continuing in an axis direction of the column part at predetermined intervals along the outer peripheral surface of column part is prepared. The column part 11 of the first molded product is punched out in an axis direction of the column part with retaining the fin part 12 to remove the column part, and the fin part 12 having helical shape left after the removal is coated with an insulating film. Then both sides of the fin part 12 in a direction F punching out the column part 11 are pressurized to deform the fin part 12 such that flat plate portions of the fin part 12 are superposed on one another.

8 Claims, 12 Drawing Sheets

(a)

(b)

METHOD AND APPARATUS FOR MANUFACTURING MOTOR COIL

CROSS REFERENCE TO RELATED APPLICATIONS AND INCORPORATION BY REFERENCE

This application based upon and claims the benefit of priority from the prior Japanese Patent Application No. 2003-103807, filed on Apr. 8, 2003; the entire content of which is incorporated herein by reference.

BACKGROUND OF THE INVENTION

1. Field of the Invention

The present invention relates to a process for the preparation of a motor coil, particularly a motor coil which is penetrated and retained by a column-shaped motor core and in which a ribbon conductor is disposed such that a width direction of the ribbon conductor is extended in a radius direction of the motor core and the ribbon conductor is helically superposed on one another in an axis direction of the motor core and along an outer peripheral surface of the motor core, and an apparatus for the preparation of the motor coil.

2. Description of the Related Art

For instance, a motor coil which is retained by a column-shaped through motor core and in which a ribbon conductor is disposed such that a width direction of the ribbon conductor is extended in a radius direction of the core and the ribbon conductor is helically superposed on one another in an axis direction of the core and along an outer peripheral surface of the core, has been already suggested. The motor coil is referred to as a longitudinally wound motor coil.

FIG. 11 and FIG. 12 are views for explaining a process for preparing the longitudinally wound motor coil. In the conventional process, first a block 101 composed of copper or aluminum is prepared as one body by extrusion molding, and a helical groove 104 is formed on the block 101, the groove 104 reaching from an outer peripheral surface 102 of the block to a hollow part 103 of the block, whereby a helical electric current path is formed.

In more detail, as shown in FIG. 11, a rotating cutting tool 110 moves in the direction of the arrow, and forms a straight groove 104a on the block 101. The groove is formed at same intervals so as to have necessary winding number. Thereafter, as shown in FIG. 12, the locations of the block 101 and the cutting tool 110 are changed relatively, whereby a straight groove 104b is formed. Beginning and end points of the groove 104b are obliquely connected with the groove 104a to form the helical groove 104 on the block 101. Further it is already known that the grooves 104a and 104b are simultaneously formed by using the cutting tools 110 of the same number as that of the grooves arranged in a row (see JA07-163100).

SUMMARY OF THE INVENTION

In case the grooves are formed by a single cutting tool 110 mentioned previously, it is required that the tool 110 is moved at a uniform velocity. Therefore a number of steps become necessary, which brings about reduction of productivity and increase of cost.

In case the grooves are simultaneously formed by using the plural cutting tools 110 arranged in a row, the block 101 receives some processing load given in one direction to the block and therefore may deform during the processing operation. Hence, it is difficult to form the grooves at same intervals by this process.

Further when the intervals between the grooves are increased so as to have sufficient rigidity to stand the processing load, the winding number comes to reduce whereby performance desired as a motor coil cannot be acquired.

In view of the above-mentioned problems, the object of the present invention is to provide a process for the preparation of a motor coil by which a longitudinally wound motor coil can be easily prepared.

Further, the object of the present invention is to provide an apparatus for the preparation of a motor coil by which a longitudinally wound motor coil can be easily prepared.

The present first invention to attain the object is provided by a process for the preparation of a motor coil which is penetrated and retained by a column-shaped motor core (i.e., retained by passing through a column-shaped motor core) and which has a ribbon conductor which is disposed such that a width direction of the ribbon conductor is extended in a radius direction of the motor core, the ribbon conductor being helically superposed on one another in an axis direction of the motor core and along an outer peripheral surface of the motor core, comprising:

a first step for molding a mother material to prepare a first molded product comprising a column part, and a fin part projected in the form of flat plate from an outer peripheral surface of the column part to an outer side in a radial direction of the column part and helically continuing in an axis direction of the column part at predetermined intervals along the outer peripheral surface of column part;

a second step for punching out the column part from the first molded product in an axis direction of the column part (from one end to the other end of the column part) with retaining the fin part to remove the column part to prepare a second molded product helically formed by the fin part;

a third step for coating the second molded product with an insulating film to prepare a third molded product; and a fourth step for pressurizing both sides of the third molded product in a direction having punched out the column part to deform the third molded product such that flat plate portions of the fin part are superposed on one another.

In the first invention, a mother material is molded to prepare a first molded product comprising a column part, and a fin part projected in the form of flat plate outward in a radial direction of the column part from an outer peripheral surface of the column part and helically continuing in an axis direction of the column part at predetermined intervals along the outer peripheral surface of the column part.

Subsequently, the column part of the first molded product is punched out in an axis direction of the column part from the first molded product with retaining the fin part to remove the column part whereby a second molded product helically formed by the fin part is obtained. Thereafter the second molded product is coated with an insulating film to prepare a third molded product. Finally, both sides of the third molded product in a direction having punched out the column part is pressurized to be deformed to the third molded product such that adjacent flat plate portions of the fin part are superposed on one another, whereby the motor coil is prepared.

Hence, a longitudinally wound motor coil, so called, in which a ribbon conductor is disposed such that a width direction of the ribbon conductor is extended in a radius direction of the motor core, the ribbon conductor being helically superposed on one another in an axis direction of the motor core and along an outer peripheral surface of the motor core, can be prepared by the process of the invention. The process makes it possible to easily prepare the longitudinally wound motor coil having high precise dimension, and further enables enhancement of the productivity and reduction of the manufacturing cost.

The second invention is provided by an apparatus for the preparation of a motor coil which is penetrated and retained by a column-shaped motor core and which has a ribbon conductor which is disposed such that a width direction of the ribbon conductor is extended in a radius direction of the motor core, the ribbon conductor being helically superposed on one another in an axis direction of the motor core and along an outer peripheral surface of the motor core, comprising:

a first means for molding a mother material to prepare a first molded product comprising a column part, and a fin part projected in the form of flat plate from an outer peripheral surface of the column part to an outer side in a radial direction of the column part and helically continuing in an axis direction of the column part at predetermined intervals along the outer peripheral surface of column part;

a second means for punching out the column part from the first molded product in an axis direction of the column part (from one end to the other end of the column part) with retaining the fin part to remove the column part to prepare a second molded product helically formed by the fin part;

a third means for coating the second molded product with an insulating film to prepare a third molded product; and a fourth step for pressurizing both sides of the third molded product in a direction having punched out the column part to deform the third molded product such that flat plate portions of the fin part are superposed on one another.

In the second invention, a mother material is molded to prepare a first molded product comprising a column part, and a fin part projected in the form of flat plate outward in a radial direction of the column part from an outer peripheral surface of the column part and helically continuing in an axis direction of the column part at predetermined intervals along the outer peripheral surface of the column part.

Subsequently, the column part of the first molded product is punched out in an axis direction of the column part from the first molded product with retaining the fin part to remove the column part whereby a second molded product helically formed by the fin part is prepared. Thereafter the second molded product left by the removal is coated with an insulating film to prepare a third molded product. Finally, both sides of the third molded product in a direction having punched out the column part is pressurized to deform the third molded product such that flat plate portions of the fin part are superposed on one another, whereby the motor coil is prepared.

Hence, a longitudinally wound motor coil, so called, in which a width direction of a ribbon conductor is extended in a radius direction of the motor core and the ribbon conductor is helically superposed on one another in an axis direction of the motor core and along an outer peripheral surface of the motor core, can be prepared by the process of the invention. The process makes it possible to easily prepare the longitudinally wound motor coil having high precise dimension, and further enables enhancement of the productivity and reduction of the manufacturing cost.

The preferred embodiment (1) is provided by the apparatus for the preparation of a motor coil, wherein the first means comprising:

a column-shaped space part capable of accommodating the column-shaped mother material in the condition that the material is extended in the longitudinal direction, a forging mold having in an interior thereof a fin-shaped space part continued helically along an outer peripheral surface of the column-shaped space part, and a forging punch capable of molding the first molded product by pressurizing the mother material charged in the forging mold from the both sides in an axis direction of the mother material.

The embodiment (1) is an example of the first means for preparing the first molded product. In the embodiment (1), the first means is provided with a column-shaped space part capable of accommodating the column-shaped mother material in the condition that the material is extended in longitudinal direction, a forging mold having in an interior thereof a fin-shaped space part continued helically along an outer peripheral surface of the column-shaped space part, and a forging punch capable of molding the first molded product by pressurizing the mother material charged in the forging mold from the both sides in an axis direction of the mother material, and the first molded product can be prepared by forging using this first means. The use of the forging makes it possible to prepare the first molded product having high precise dimension in reduced manufacturing cost and at high speed.

The preferred embodiment (2) is provided by the apparatus for the preparation of a motor coil, wherein the forging mold has plural plate-shaped blocks having a "U"-shape in a plan view and capable of forming an opening hole extended in the longitudinal direction by linking a pair of the blocks with each other in faces (mating surfaces) of both sides of the blocks in a right-left arrangement and superposing a plurality of the combined blocks on one another in the longitudinal direction, the plate-shaped blocks comprising:

an upper side part extended approximately horizontally in the direction from the face of one end thereof, a lower side part extended approximately horizontally in the direction from the face of the other end thereof in a location under the upper side part, an inclined part, whose two ends linking to the upper side part and the lower side part, continuously extended from the upper side part to the lower side part, while the inclined part gradually descending from the upper side part to the lower side part, a notch part formed by notching the face side area of the inclined part in longitudinal direction, and a recess part provided by depressing an upper surface of the plate-shaped block to a predetermined depth from the upper surface and a predetermined width from the notch part continuing from the face of the upper side part to the lower side part along an upper end of the notch part; and wherein the plate-shaped blocks are combined right and left with each other in their faces to continuously link an upper surface of the lower side part of one plate-shaped block with an upper surface of the upper side part of the other plate-shaped block and continuously link a lower surface of the upper side part of the one plate-shaped block with an upper surface of the lower side part of the other plate-shaped block, and the column-shaped space part is formed by combining the notches of the plate-shaped blocks, and the fin-shaped space part is formed by combining the recess part of each of the plate-shaped blocks with an under surface of the plate-shaped block superposed on the recess part.

The embodiment (2) is an example of the forging mold mentioned above. In the embodiment (2), the forging mold has plural plate-shaped blocks having a "U"-shape in a plan view and capable of forming an opening hole extended in the longitudinal direction by combining a pair of the blocks with each other in faces of both sides of the blocks arranged right and left and superposing a plurality of the combined blocks on one another in the longitudinal direction.

The plate-shaped blocks comprises an upper side part extended approximately horizontally in the direction from the face of one end thereof, a lower side part extended approximately horizontally in the direction from the face of the other end thereof in the location under the upper side part, an inclined part gradually descending with moving from the upper side part to the lower side part, two ends of the inclined part continuously linking to the upper side part and the lower side part, a notch part formed by notching the face side area of the inclined part in longitudinal, and a recess part provided by depressing an upper surface of the plate-shaped block to a predetermined depth from the upper surface and a predetermined width from the notch part continuing from the face of the upper side part to the lower side part along an upper end of the notch part.

Further, the plate-shaped blocks are combined right and left with each other in their faces to continuously link an upper surface of the lower side part of one plate-shaped block with an upper surface of the upper side part of the other plate-shaped block and continuously link a lower surface of the upper side part of the one plate-shaped block with an upper surface of the lower side part of the other plate-shaped block, and the column-shaped space part is formed by combining the notches of the plate-shaped blocks, and the fin-shaped space part is formed by combining the recess part of each of the plate-shaped blocks with an under surface of the plate-shaped block superposed on the recess part.

Hence, the plural plate-shaped blocks are superposed on one another, and combined with right and left in the face, whereby the column-shaped space part capable of accommodating the column-shaped mother material in the condition that the material is extended in longitudinal direction, and the fin-shaped space part continued helically along the outer peripheral surface of the column-shaped space part can be formed in the forging mold. Hence, the first molded product can be prepared by retaining the mother material in the forging mold and pressurizing both sides in the axis direction of the mother material by a forging punch.

The preferred embodiment (3) is provided by the apparatus for the preparation of a motor coil, wherein the second means comprises:

a punching die having a retaining part for retaining the fin part of the first molded product and a punching hole enabling the punching out of the column part of the first molded product in the axis direction, and a punch for punching out the column part of the first molded product in the axis direction in cooperation with the punching hole of the punching die.

The embodiment (3) is an example of the second means for preparing the second molded product. According the embodiment (3), the second means has a punching die having a retaining part for retaining the fin part of the first molded product and a punching hole capable of punching out the column part of the first molded product in the axis direction, and a punch for punching out the column part of the first molded product in the axis direction in cooperation with the a punching hole of the punching die, and thus the second molded product is prepared by punching out the column part of the first molded product on the axis direction with retaining the fin part of the first molded product. Such preparation by the punching makes it possible to prepare the second molded product having high precise dimension in reduced manufacturing cost and at high speed.

The preferred embodiment (4) is provided by the apparatus for the preparation of a motor coil according the embodiment (3), wherein the punching die has a plurality of plate-shaped blocks having a "U"-shape in a plan view and capable of forming a punching hole extended in the longitudinal direction by combining a pair of the blocks with each other in faces of both sides of the blocks arranged right and left and superposing a plurality of the combined blocks on one another in longitudinal direction, the plate-shaped blocks comprising:

an upper side part extended approximately horizontally in the direction from the face of one end thereof, a lower side part extended approximately horizontally in the direction from the face of the other end thereof in the location under the upper side part, an inclined part, whose two ends link to the upper side part and the lower side part, continuously extended from the upper side part to the lower side part, while the inclined part gradually descending from the upper side part to the lower side part, a notch part formed by notching the face side area of the inclined part in longitudinal direction, and a recess part provided by depressing an upper surface of the plate-shaped block to a predetermined depth from the upper surface and a predetermined width from the notch part continuing from the face of the upper side part to the lower side part along an upper end of the notch part; and wherein the plate-shaped blocks are combined right and left with each other in their faces to continuously link an upper surface of the lower side part of one plate-shaped block with an upper surface of the upper side part of the other plate-shaped block and continuously link a lower surface of the upper side part of the one plate-shaped block with an upper surface of the lower side part of the other plate-shaped block, and the opening hole is formed by using the notches of the plate-shaped blocks, and the retaining part is formed by combining the recess part of each of the plate-shaped blocks with an under surface of the plate-shaped block superposed on the recess part.

The embodiment (4) is an example of the punching die. According to the embodiment (4), the punching die is provided with plural plate-shaped blocks having a "U"-shape in a plan view and capable of forming a punching hole extended in the longitudinal direction by combining a pair of the blocks with each other in faces of both sides of the blocks arranged right and left and superposing a plurality of the combined blocks on one another in the longitudinal direction.

The plate-shaped blocks has an upper side part extended approximately horizontally in the direction leaving the face of one end thereof, a lower side part extended approximately horizontally in the direction leaving the face of the other end thereof in a location under the upper side part, an inclined part, whose two ends link to the upper side part and the lower side part, continuously extended from the upper side part to the lower side part, while the inclined part gradually descending from the upper side part to the lower side part, a notch part formed by notching the face side area of the inclined part in longitudinal direction, and a recess part provided by depressing to a predetermined depth from an upper surface of the plate-shaped block and a predetermined width from the notch part with continuing from the face of the upper side part to that of the lower side part along an upper side of the notch part.

Further the plate-shaped blocks are combined right and left with each other in the faces to continuously link an upper surface of the lower side part of one plate-shaped block with an upper surface of the upper side part of the other plate-shaped block and continuously link a lower surface of the upper side part of the one plate-shaped block with an upper surface of the lower side part of the other plate-shaped block, and the opening hole is formed by using the notches of the plate-shaped blocks, and the retaining part is formed by combining the recess part of each of the plate-shaped blocks with an under surface of the plate-shaped block superposed on the recess part.

Hence, the plural plate-shaped blocks having the above-mentioned structure are inserted between the fin parts of the first molded product, combined with each other right and left and superposed on one another in the axis direction along the column part of the first molded product, whereby the column part can be retained such that it can be punched in the conditions that the fin parts are retained in the punching die. Hence, the second molded product can be prepared by retaining the fin parts of the first molded product and punching the column part from one end to the other end of the column part in the axis direction.

DETAILED DESCRIPTION OF THE INVENTION

Figure 1:
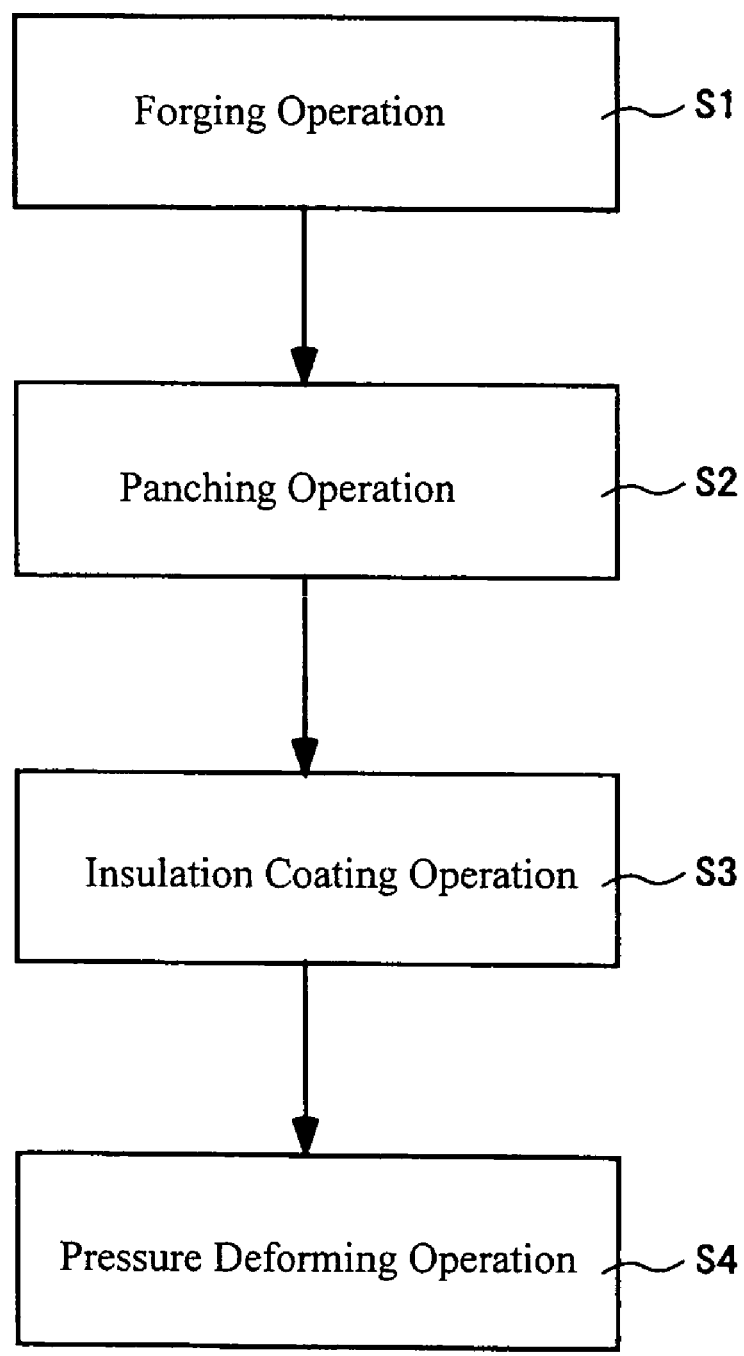
FIG. 1 is a flow chart for explaining a process for preparing a motor coil.

Embodiments of the present invention are explained by reference of FIG. 1. FIG. 1 is a flow chart for explaining a process for preparing a motor coil of the invention.

Figure 4:
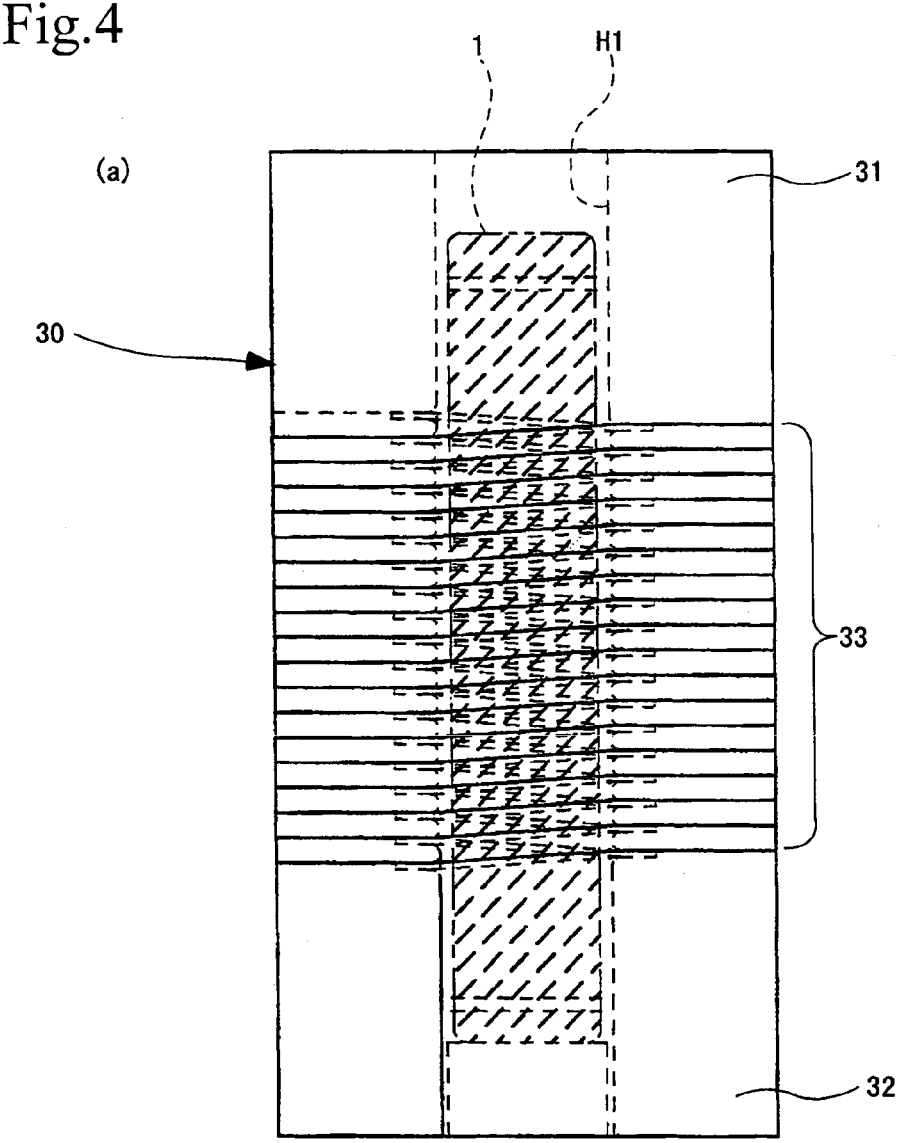
FIGS. 4(a) and 4(b) are whole view for schematically illustrating a forging mold attached to the forging apparatus shown in FIG. 3.
Figure 4:
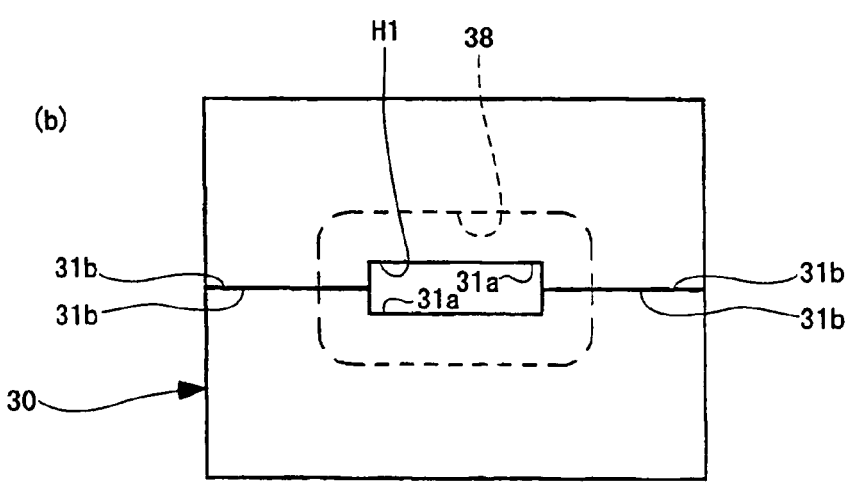

First a forging operation, in which a first molded product 10 (referring to FIG. 2) is molded from a mother material 1 (referring to FIG. 4 (a)), is carried out. The mother material 1 is composed of, for example, the same material as material used in a motor coil (e.g., aluminum or steel) and has a column shape capable of being charged in a forging mold 30.

Figure 2:
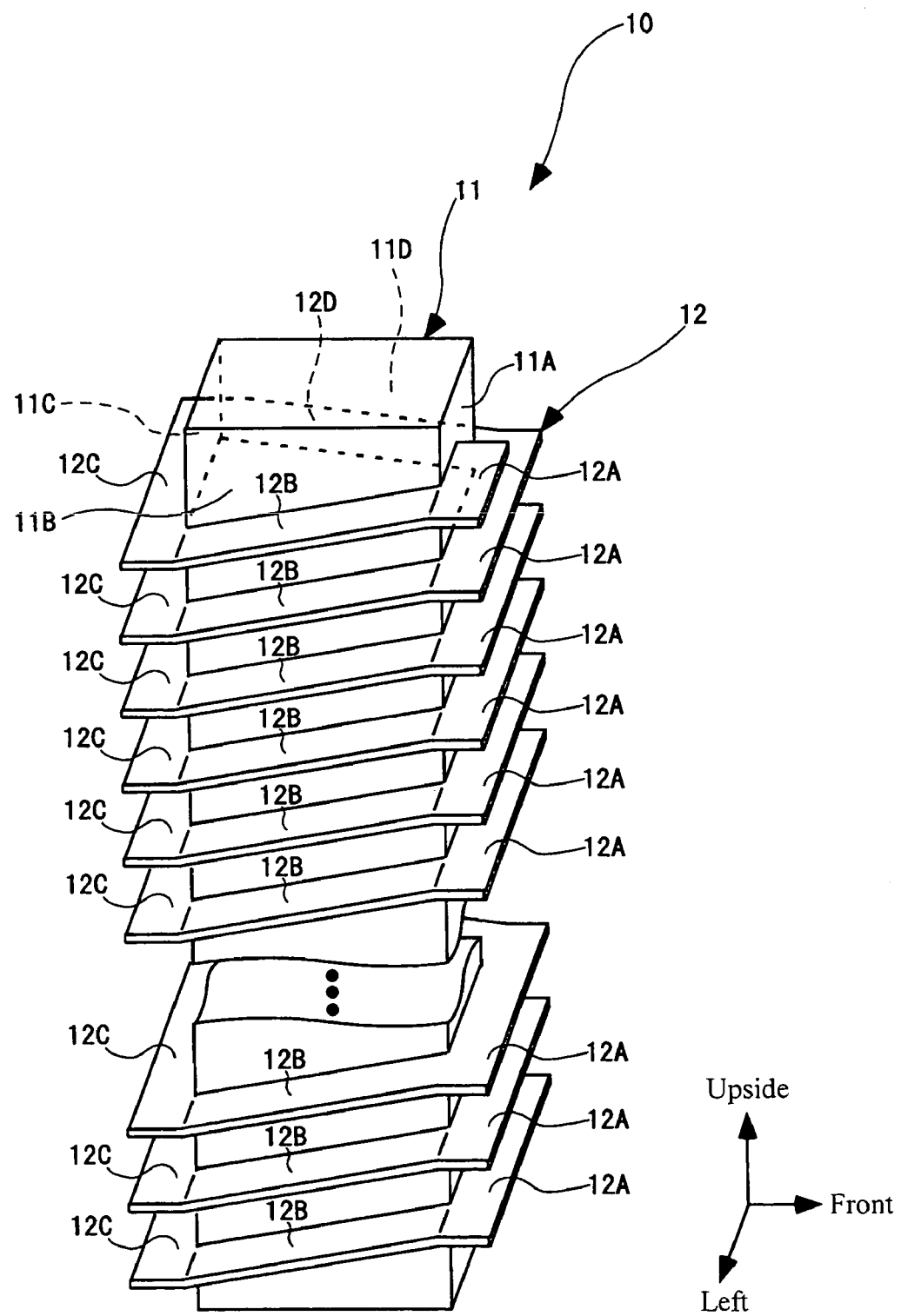
FIG. 2 is a perspective view for schematically illustrating a first molded product molded by a forging operation.

FIG. 2 is a perspective view for schematically illustrating the first molded product 10 molded by the forging operation. The first molded product 10 is formed so as to have a column part 11 and a fin part 12 projected from an outer peripheral surface of the column part by molding a mother material 1 (referring to FIG. 4(a)) in the forging mold 30. The column part 11 has an approximately rectangular shape in a cross sectional view which has the approximately same area as a cross-sectional shape of a motor core (not shown in figure).

The fin part 12 is projected in the form of flat plate outward in a radial direction of the column part 11 from an outer peripheral surface of the column part, and helically disposed squarely so as to move in an axis direction of the column part 11 with moving gradually in the peripheral direction along the outer peripheral surface of column part. The shape formed by the helically disposing is a square.

The shape of the fin part 12 is explained in detail based on FIG. 2. A front plate-shaped part 12A of the fin part 12 projected from a front side 11A of the column part 11 extends between a left surface 11B and a right surface 11D of the column part 11 in the horizontal direction orthogonalizing with respect to the axis direction of the column part 11, and disposed at same intervals in the axis direction of the column part 11.

A rear plate part 12C of the fin part 12 projected from a rear surface 11C of the column part 11 extends between a left surface 11B and a right surface 11D of the column part 11 in the horizontal direction orthogonalizing with respect to the axis direction of the column part 11, and disposed at same intervals in the axis direction of the column part 11, similarly to the front plate-shaped part 12A. Further the front plate part 12A and the rear plate part 12C are disposed alternately with respect to the axis direction of the column part 11.

A rear plate part 12B of the fin part 12 projected from a left surface 11B of the column part 11 extends between a front surface 11A and a rear surface 11C of the column part 11 in the direction obliquely intersecting with respect to the axis direction of the column part 11, and links between an end in the left side (of the column part 11) of the front plate-shaped part 12A and an end in a left side (of the column part 11) of the rear plate-shaped part 12C provided thereunder in the axis direction.

A right plate part 12D of the fin part 12 projected from a right surface 11D of the column part 11 extends between a front surface 11A and a rear surface 11C of the column part 11 in the direction obliquely intersecting with respect to the axis direction of the column part 11, and links between an end in the right side (of the column part 11) of the front plate-shaped part 12A and an end in the right side (of the column part 11) of the rear plate-shaped part 12C provided thereup in the axis direction.

Figure 3:
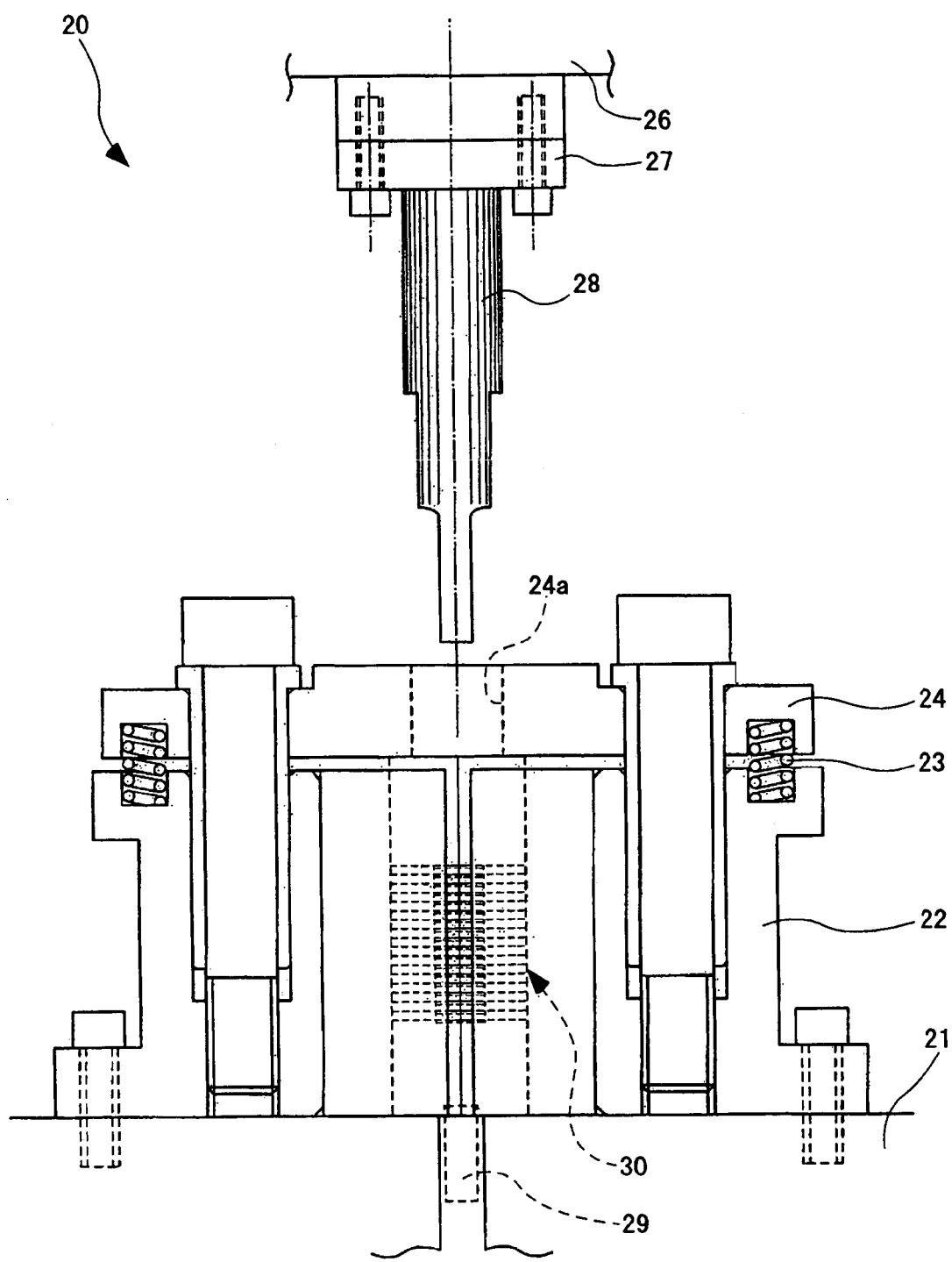
FIG. 3 is a perspective view for schematically explaining an important part of a forging apparatus used in a forging operation.

FIG. 3 is a perspective view for schematically explaining an important part of a forging apparatus (means for preparing the first molded product) used in a forging operation (forging step). The forging apparatus 20 has a bolster 21 and a slide 26. The bolster 21 is provided with a pedestal part 22 having a retaining mechanism for retaining the forging mold, and a pressure plate 24 supported moveably in the longitudinal direction above the pedestal part 22 and capable of receiving the pressure load of the slide 26 by pressure given upward with a spring 23.

A forging punch 28 is attached to the slide 26 via a punch holder 27. The forging punch 28 moves from an upper side to a lower side of the pressure plate 24 with movement of the slide 26, whereby it passes through an inside of a pass-through (penetrating) hole 24a opened in an approximately central position of the pressure plate 24 to reach a forging mold 30 to pressurize a mother material 1 (referring to FIG. 4) in the forging mold 30.

FIG. 4 is a whole view for schematically illustrating the forging mold attached to the forging apparatus in FIG. 3, and FIG. 4(*a*) is a left side view and FIG. 4(*b*) is a plan view. As shown in FIG. 4(*a*), the forging mold 30 is composed of an upper base 31, a lower base 32 and plural plate-shaped blocks 33 superposed (layered) between the upper base 31 and the lower base 32. Further as shown in FIG. 4(*b*), an opening hole H1 is formed which passes through a center of the forging mold 30 in the longitudinal direction and which is capable of accommodating the mother material 1 in the condition extending in a longitudinal direction.

Figure 5:
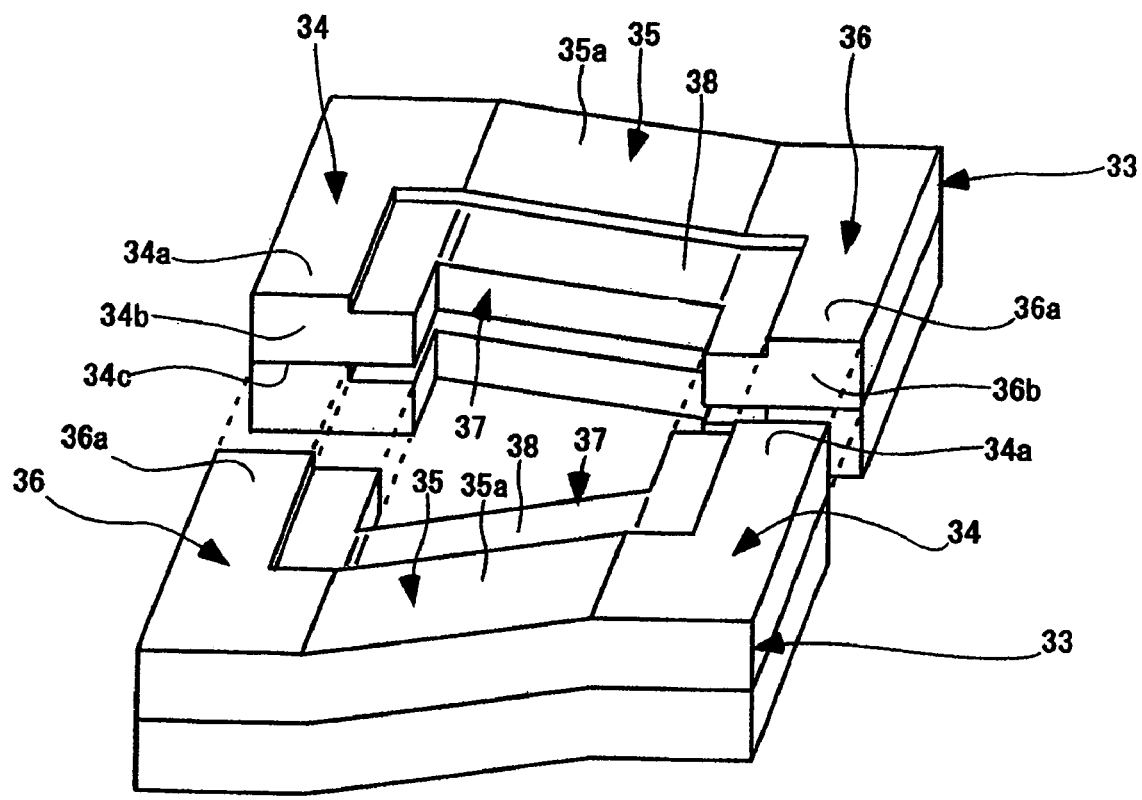
FIG. 5 is a perspective view for explaining a structure of a plate-shaped block.
Figure 5:
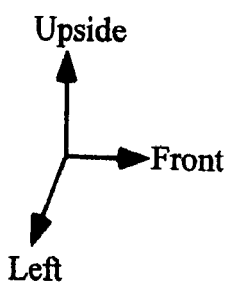

FIG. 5 is a perspective view for explaining a structure of a plate-shaped block 33. As shown in FIG. 5, the plate-shaped block 33 is composed of a rectangular plate having a predetermined thickness and a long side and short side, and has a "U" shape in a plan view that is capable of forming the opening hole H1 extended in longitudinal direction by combining a pair of the blocks with each other in faces of both sides of the blocks arranged right and left and superposing the combined blocks on one another in longitudinal direction.

As for the plate-shaped blocks, the block has an upper side part 34 extended in the direction leaving the face 34*b* of its one end, a lower side part 36 extended in the direction leaving the face 36*b* of the other end in the location under the upper side part 34, and an inclined part 35, whose two ends link to the upper side part 34 and the lower side part 36, continuously extended from the upper side part 34 to the lower side part 36, while the inclined part gradually descending with moving from the upper side part 34 to the lower side part 36.

The upper side part 34 and the lower side part 36 are approximately horizontally extended in the condition that the plate-shaped block 33 is retained between the upper base 31 and the lower base 32. The inclined part 35 is, as shown in, for example, FIG. 5, formed such that the upper surface 36*a* of the lower side part of the plate-shaped block 33 disposed in the left side (this side of the figure) is flush with the lower surface 34*c* of the upper side part of the plate-shaped block 33 disposed in the right side (the inner side of the figure) to form a continuous surface having an inclined angle, when the upper surface 34*a* of the upper side part of the plate-shaped block 33 disposed in the left side (this side of the figure) is approximately flush with the upper surface 36*a* of the lower side part of the plate-shaped block 33 disposed in the right side (the inner side of the figure) to form a continuous surface.

A notch part 37 is formed between a face 34*b* in the side of the upper side part 34 and a face 36*b* in the side of the lower side part 36 by notching an area in the side of the faces of inclined part 35 in the longitudinal direction. The notch part 37 has shape capable of forming an intermediate portion of the opening hole H1 in cooperation with the notch part 37 of an opposite plate-shaped block 33.

Further, a recess part 38 is provided on the upper surface of the plate-shaped block 33 by depressing the upper surface to form the fin part 12 of the first molded product 10. The recess part 38 continues from the face 34*b* of the upper side part 34 to the face 36*b* of the lower side part 36 along an upper end of the notch part 37, and is formed so as to have the approximately same dimension depth as the thickness of the fin part 12 and the approximately same width as the projected width of the fin part 12 throughout from the corner parts of the upper surface 34*a* of the upper side part, the upper surface 35*a* of the inclined part and the upper surface 36*a* of the lower side part of the plate-shaped block 33 to the corner parts of the upper end of the notch part 37.

On the other hand, as shown in FIG. 4(*a*), the upper base 31 and the lower base 32 has block shape capable of retaining by putting the laminated plate-shaped blocks 33 between the bases from upper and lower directions, and further a structure capable of dividing into two portions right and left by the face 31*b* extending longitudinally by continuation of the faces 34*b* and 36*b* of the plate-shaped block 33.

Further, as shown in FIG. 4(*b*), a notch part 31*a* is formed on a central portion of the faces 31*b* by notching the central portion in longitudinal direction in the same dimension as the face 37. The notch part 31*a* has a shape capable of forming upper and lower end portions of the opening hole H1 in cooperation with the opposite notch part 31*a* of the upper base 31. Also though the lower base 32 is provided with the notch part having the same structure as above, it has the same shape as that of the upper base 31 shown in FIG. 4(*b*). Therefore, the detailed explanation is omitted.

Hence, plurality (17 in FIG. 4) of right-and-left pairs of plate-shaped blocks 33 mentioned above, are superposed (layered) to a laminate, the laminate is put between the upper base 31 and lower base 32 such that the upper side of the laminate is in contact with the upper base 31 and the lower side in contact with the lower base 32, and they are retained by retaining mechanism of the pedestal part 22 (referring to FIG. 3), whereby a column-shaped space extended longitudinally the inside of the forging mold 30 in the center of the forging mold 30 and a fin-shaped space continued helically the outer peripheral surface of the column-shaped space can be formed.

In case the above-mentioned first molded product 10 is forging-molded using the forging apparatus 20 having the structure mentioned above, a mother material 1 is first charged in the opening hole H1 of the forging mold 30 as shown in FIG. 4, and the forging mold 30 is set on a bolster 21 by the retaining mechanism of the pedestal part 22. A cushion pin 29 is provided under the opening hole H1 so as to project from the bolster 21 into the opening hole H1, and the mother material 1 is supported in the conditions that it is placed on the cushion pin 29.

Thereafter, a forging punch 28 is longitudinally moved by a slide 26, and the mother material 1 in the mold 30 is pressurized with a tip of forging punch 28. The mother material 1 is crush in the axis direction by pressurization of the forging punch to spread out in the radius direction to deform. Thus, the outer peripheral surface of the mother material 1 is in contact with the notch part 31*a* of the upper base 31, the notch part of the lower base 32, and the notch part 37 of the plate-shaped block 33 to form the column part 11. Further, a part of the mother material 1 enters into the recess part 38 of the plate-shaped block 33 to form the fin part 12. Hence, the first molded product 10 shown in FIG. 2 is prepared. By preparing the first molded product 10 in this manner, it is possible to easily prepare the first molded product 10 having high precise dimension in reduced manufacturing cost and high speed.

Figure 6:
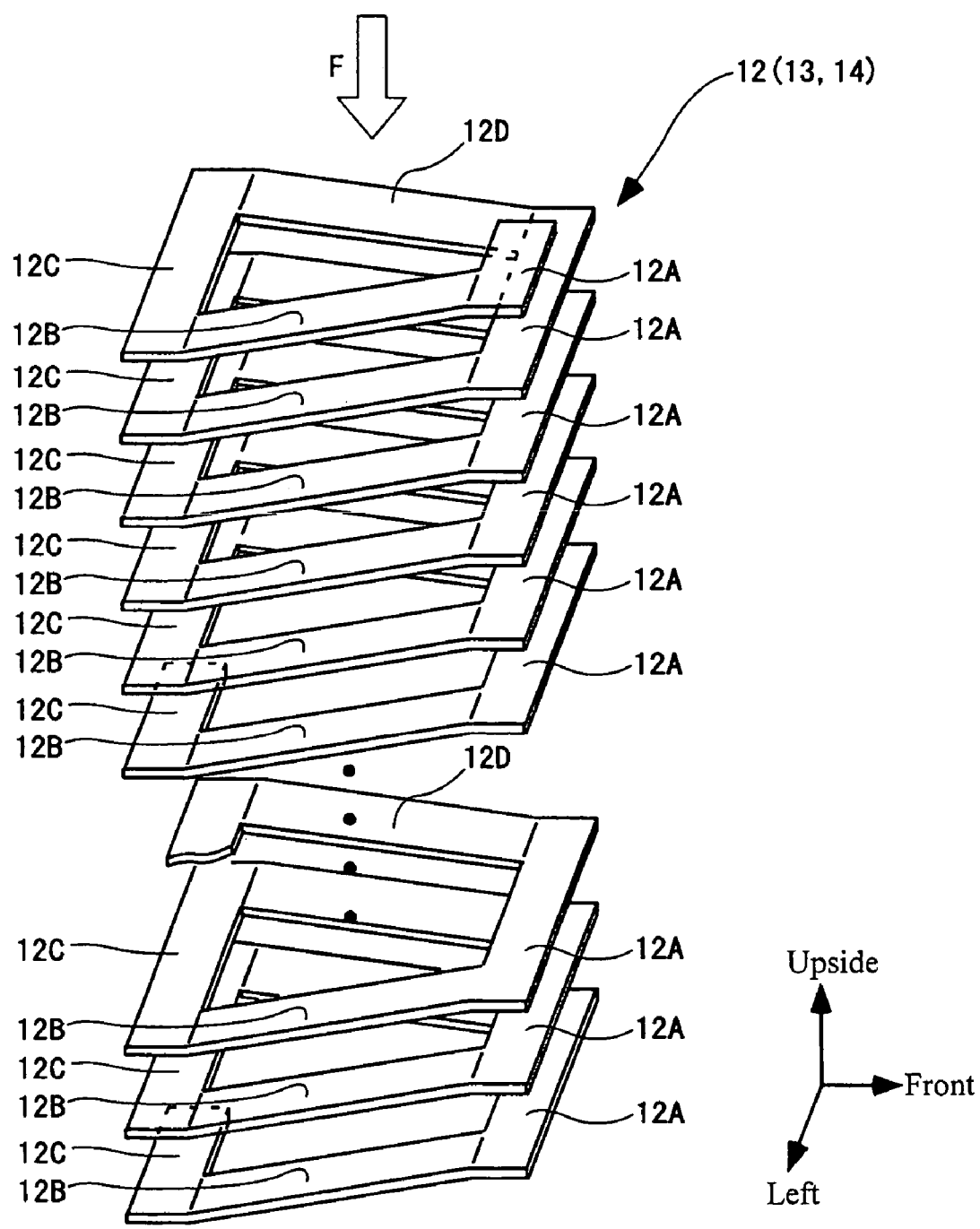
FIG. 6 is a perspective view for schematically illustrating a second molded product molded by a punching operation.

After the forging molding of the first molded product 10, the first molded product 10 is subjected to a punching processing to form a second molded product 13 shown in FIG. 6 whereby the punching operation is carried out (Step S2 of FIG. 1). In the operation, the column part 11 is punched out in the axis direction from its one end to the other end, while the fin part 12 of the first molded product 10 molded in the forging operation is retained. This punching operation removes the column part 11 from the first molded product 10 to form the second molded product 13 consisting of only the fin part 12.

FIG. 6 is a perspective view for schematically illustrating the second molded product 13 molded by the punching operation. An arrow of FIG. 6 indicates a punching out direction of the column part 11. The second molded product 13 has a rectangular helical shape that gradually moves in the punching out direction of the column part 11 with moving in the order of from the front plate part 12A to the left plate part 12B, from the left plate part 12B to the rear plate part 12C, and from the rear plate part 12C to the right plate part 12D. The front plate part 12A, the left plate part 12B, the rear plate part 12C and the right plate part 12D are each disposed at approximately same intervals in the punching out direction of the column part 11.

Figure 7:
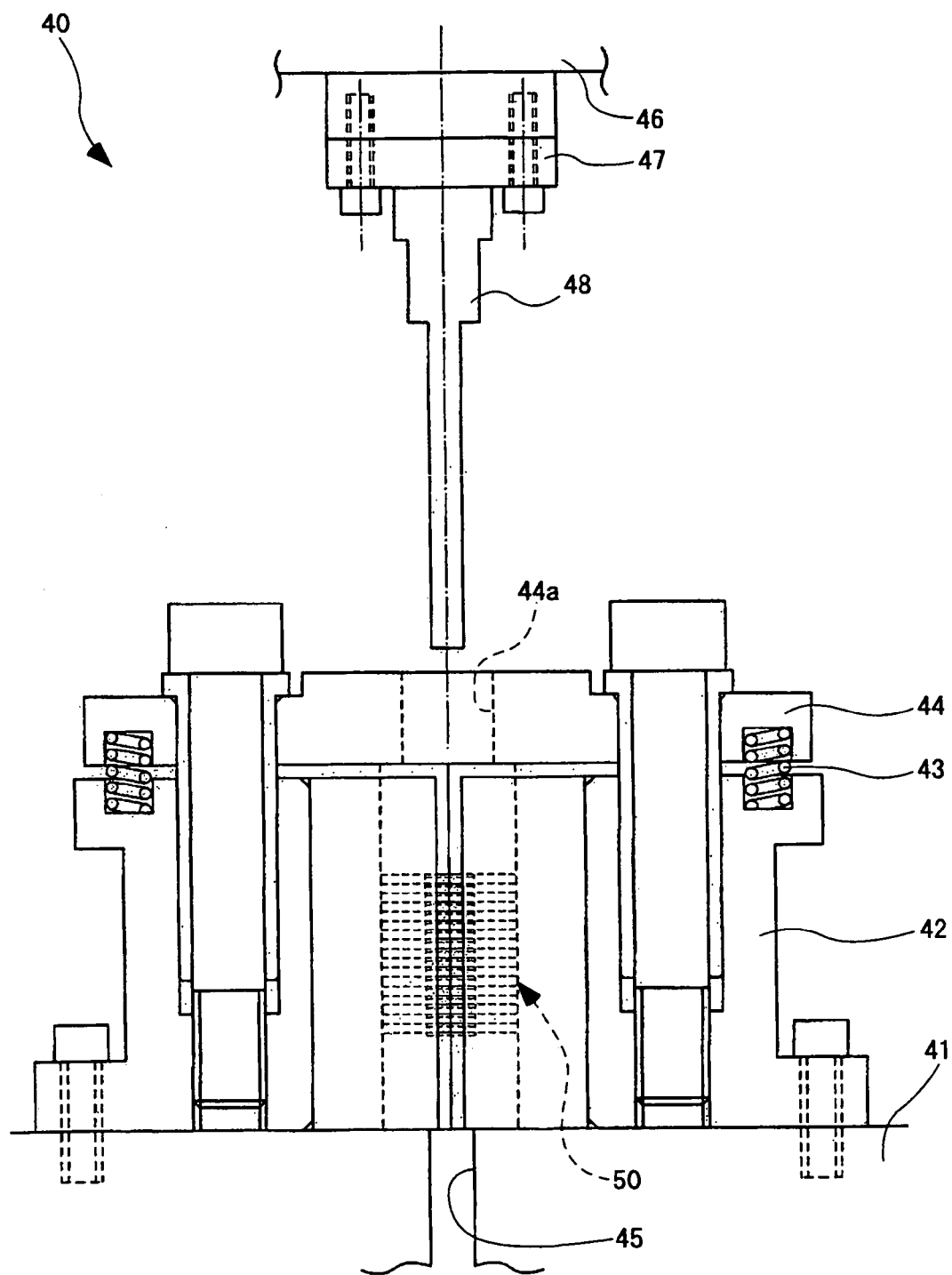
FIG. 7 is a view for schematically illustrating an important part of a punching apparatus.

FIG. 7 is a view for schematically illustrating an important part of a punching apparatus 40 (means for preparing the second molded product) used in the punching operation. The punching apparatus 40 has a bolster 41 and a slide 46 similarly to the forging apparatus 20. The bolster 41 is provided with a pedestal part 42 having a retaining mechanism for retaining a punching die 50, and a pressure plate 44 capable of receiving the pressure load of the slide 46 by pressure given upward with a spring 43 supported moveably in the longitudinal direction above the pedestal part 42.

The punch 48 is attached to the slide 46 via a punching holder 47. The punch 48 moves from the upper location to lower location of the pressure plate 44 with movement of the slide to pass through the inside of the through hole 44a to reach the punching die 50, and then serves to punch out the column part 11 of the first molded product 10 downward in cooperation with the punching die 50.

Figure 8:
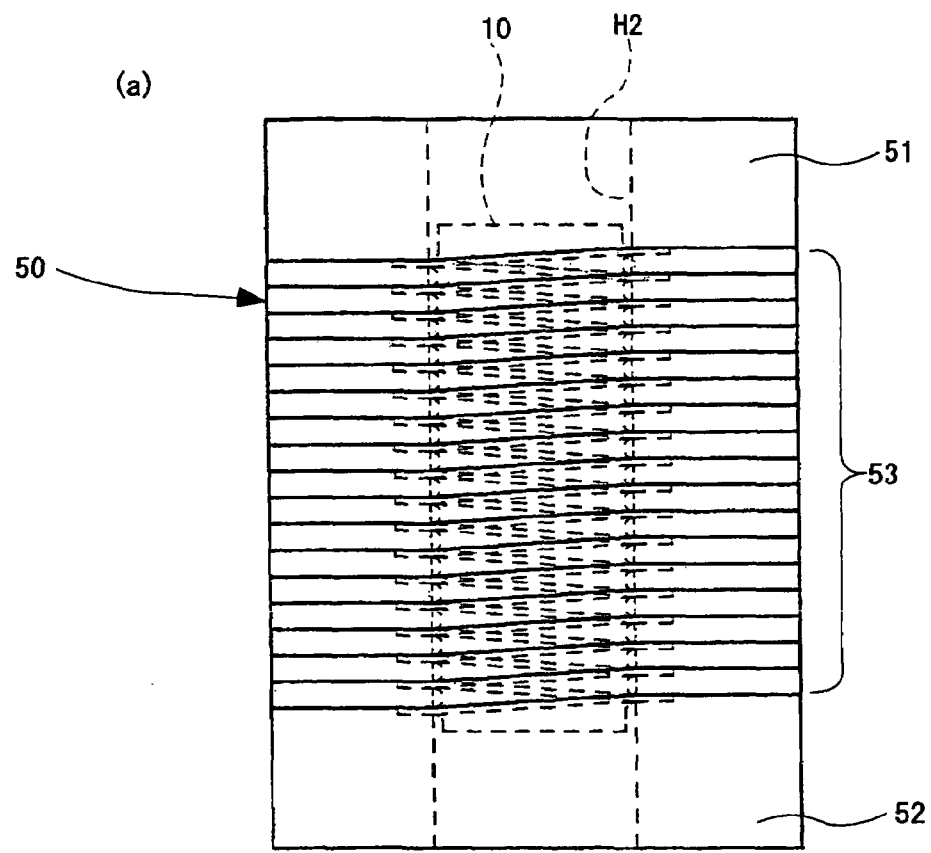
FIGS. 8(a) and 8(b) are whole view for schematically illustrating a punching die.
Figure 8:
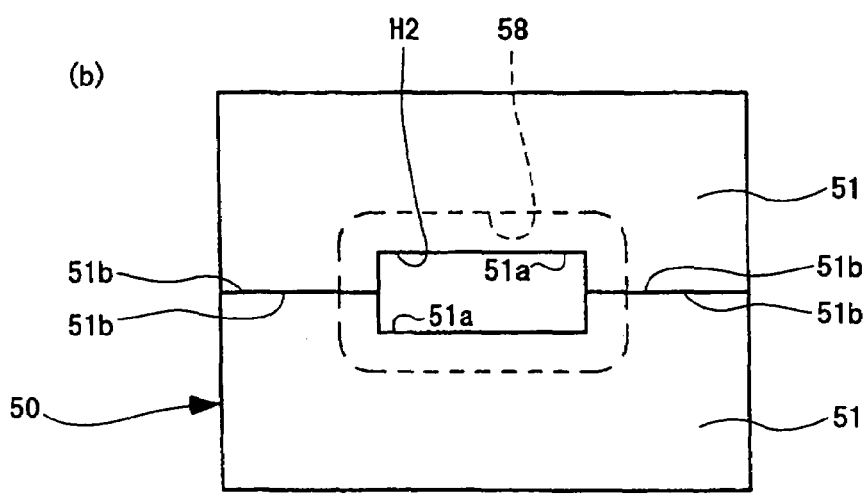

FIG. 8 is a whole view for schematically illustrating the punching die 40 attached to the punching apparatus of FIG. 7, and FIG. 8(a) is a left side view and FIG. 8(b) is a plan view. As shown in FIG. 8(a), the punching mold 50 is composed of an upper base 51, a lower base 52 and plural plate-shaped blocks 33 superposed (layered) between the upper base 51 and the lower base 52. Further as shown in FIG. 8(b), a rectangular punching hole H2 is formed which passes longitudinally through a center of the punching die 50 and which makes it possible to punch out the column part 11 of the first molded product 10 in the longitudinal direction.

Figure 9:
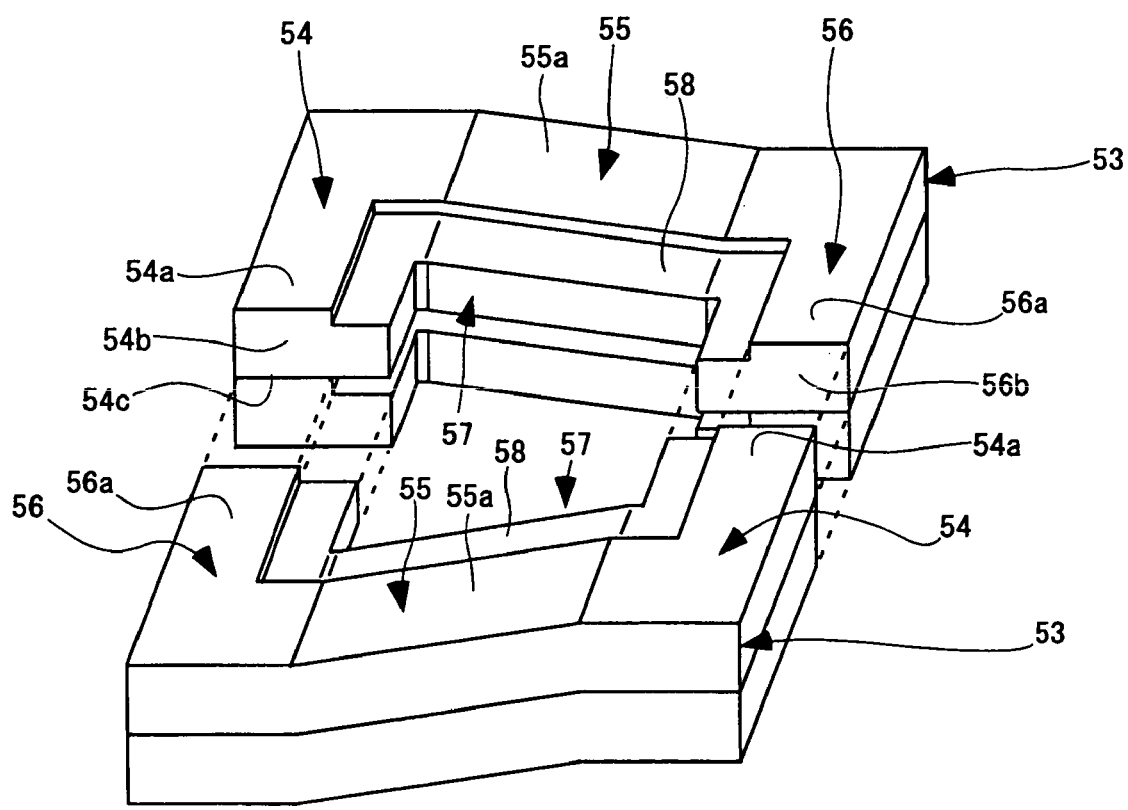
FIG. 9 is a perspective view for explaining a structure of a plate-shaped block.
Figure 9:
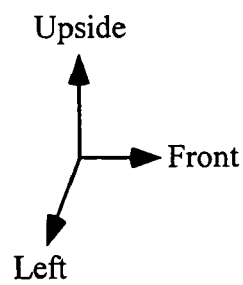

FIG. 9 is a perspective view for explaining a structure of a plate-shaped block 53. As shown in FIG. 9, the plate-shaped block 53 has "U" shape in plan view that is approximately the same as the plate-shaped block 33 of the forging mold, and capable of forming the punching hole extended in longitudinal direction by combining a pair of the blocks with each other in faces of both sides of the blocks arranged right and left and superposing the combined blocks on one another in longitudinal direction.

As for the plate-shaped blocks, the block has an upper side part 54 extended in the direction leaving the face 54b of its one end, a lower side part 56 extended in the direction leaving the face 56b of the other end in the location under the upper side part 54, and an inclined part 55, whose two ends link to the upper side part 54 and the lower side part 56, continuously extended from the upper side part 54 to the lower side part 56, while the inclined part gradually descending with moving from the upper side part 54 to the lower side part 56.

The upper side part 54 and the lower side part 56 are approximately horizontally extended in the condition that the plate-shaped block 53 is retained between the upper base 51 and the lower base 52. The inclined part 55 is, as shown in, for example, FIG. 9, formed such that the upper surface 56a of the lower side part of the plate-shaped block 53 disposed in the left side (this side of the figure) is approximately flush with the lower surface 54c of the upper side part of the plate-shaped block 53 disposed in the right side (the inner side of the figure) to form a continuous surface having an inclined angle, when the upper surface 54a of the upper side part of the plate-shaped block 53 disposed in the left side (this side of the figure) is approximately flush with the upper surface 56a of the lower side part of the plate-shaped block 53 disposed in the right side (the inner side of the figure) to form a continuous surface.

A notch part 57 is formed between a face 54b in the side of the upper side part 54 and a face 56b in the side of the lower side part 56 by notching an area in the side of the face of inclined part 55 in the longitudinal direction. The notch part 57 has shape capable of forming an intermediate portion of the punching hole H2 in cooperation with the notch part 57 of an opposite plate-shaped block 53.

Further, a recess part 58 is provided on an upper surface of the plate-shaped block 53 by depressing the upper surface to retain the fin part 12 of the first molded product 10. The recess part 58 continues from the face 54b of the upper side part 54 to the face 56b of the lower side part 56 along an upper end of the notch part 57, and is formed throughout from the corner parts of the upper surface 54a of the upper side part, the upper surface 55a of the inclined part and the upper surface 56a of the lower side part of the plate-shaped block 53 to the corner parts of the upper end of the notch part 57. Further, the recess part 58 is formed in the shape having the dimension capable of accommodating the fin part 12 in cooperation with the lower surface of the plate-shaped block 53 provided thereon.

On the other hand, as shown in FIG. 8(a), the upper base 51 and the lower base 52 have block shape capable of retaining by putting the superposed (layered) plate-shaped blocks 53 between the bases in the longitudinal direction, and further a structure capable of dividing into two portions right and left by the face 51b continuing to the faces 54b and 56b of the plate-shaped block 53 with extending longitudinally.

Further, as shown in FIG. 8(b), a notch part 51a is formed on a central portion of the face 51b by notching the central portion in longitudinal direction in the same dimension as the face 57. The notch part 51a has a shape capable of forming the upper and lower end portions of the punching hole H2 in cooperation with the opposite notch part 51a of the upper base 51. Also though the lower base 52 is provided with the same notch part as above, it has the same shape as that of the upper base 51 shown in FIG. 8(b). Therefore, the detailed explanation is omitted.

The setting of the first molded product into the punching die 50 is carried out by inserting the sides of the faces 54b, 56b of the plate-shaped blocks between the fin parts 12, layering them in the axis direction of the column part 11 of the first molded product, and putting the layered product longitudinally between the upper base 51 and the lower base 52. As a result, the fin part of the first molded product can be retained by combining the recess 58 and the plat-shaped blocks 53 layered on the recess. In the embodiment of the invention, the punching hole H2 of the punching die and the punch 48 are configured such that their dimensions are a little larger than the dimension of the column of the first molded product, and further a base end of the fin part is also configured so as to be removed together with the column part 11.

In case the above-mentioned second molded product 13 is punching-molded using the punching apparatus 40 having the above-mentioned structure, firstly the first molded product 10 is beforehand set in the punching die 50. Thereafter, the punching die 50 is set on the bolster 41 by the retaining mechanism of the pedestal part 42 and the punch 48 is allowed to descend by the slide 46. As a result, a tip of the punch 48 is inserted into the punching hole H2 from the upper side, and the column part 11 of the first molded product 10 is punched out downward in the axis direction in cooperation with the punching die 50. The column part 11 punched out is discharged downward from a discharging hole 45 that has been beforehand formed on the bolster 41, and consequently the second molded product 13 that is formed from the fin parts 12 to be helically continued is prepared in the punching die 50. In this manner, the second molded product 13 can be prepared by the punching operation (processing), whereby the second molded product 13 having highly precise dimension can be obtained in reduced manufacturing cost and at high speed.

The punch 48 is moved upward, and drawn out of the punching die 50, and then the punching die 50 is taken off the retaining mechanism of the pedestal part 42 to be disassembled to the upper base 51, the lower base 52 and the plate-shaped block 53, whereby the second molded product 13 can be taken out.

After the second molded product 13 having the above shape is molded, the second molded product 13 is subsequently coated with an insulating film whereby the insulating film coating operation is carried out (Step S3 of FIG. 1). In the embodiment of the invention, the second molded product 13 is entered in a storage tank (not shown) in which an insulating material is stored in its molten state and the insulating material is fixed on the product, whereby the coating is carried out (means for preparing a third molded product). The coating operation permits the preparation of the third molded product 14 coated with the insulating film having a predetermined thickness.

After the preparation of the third molded product 14, a motor coil 15 is obtained by subjecting the third molded product 14 to a pressure deforming processing whereby the pressure deforming operation is carried out (Step S4 of FIG. 1). In the pressure deforming operation, third molded product 14 is pressurized from the both sides of the column part 11 in the punching direction F of the column part 11, whereby a plurality of the front plate parts 12A, left plate parts 12B, rear plate parts 12C and right plate parts 12D continued at predetermined intervals in the punching direction F are deformed to a layered product in which the plates are superposed on one another in contact with one another (means for pressure deforming).

Figure 10:
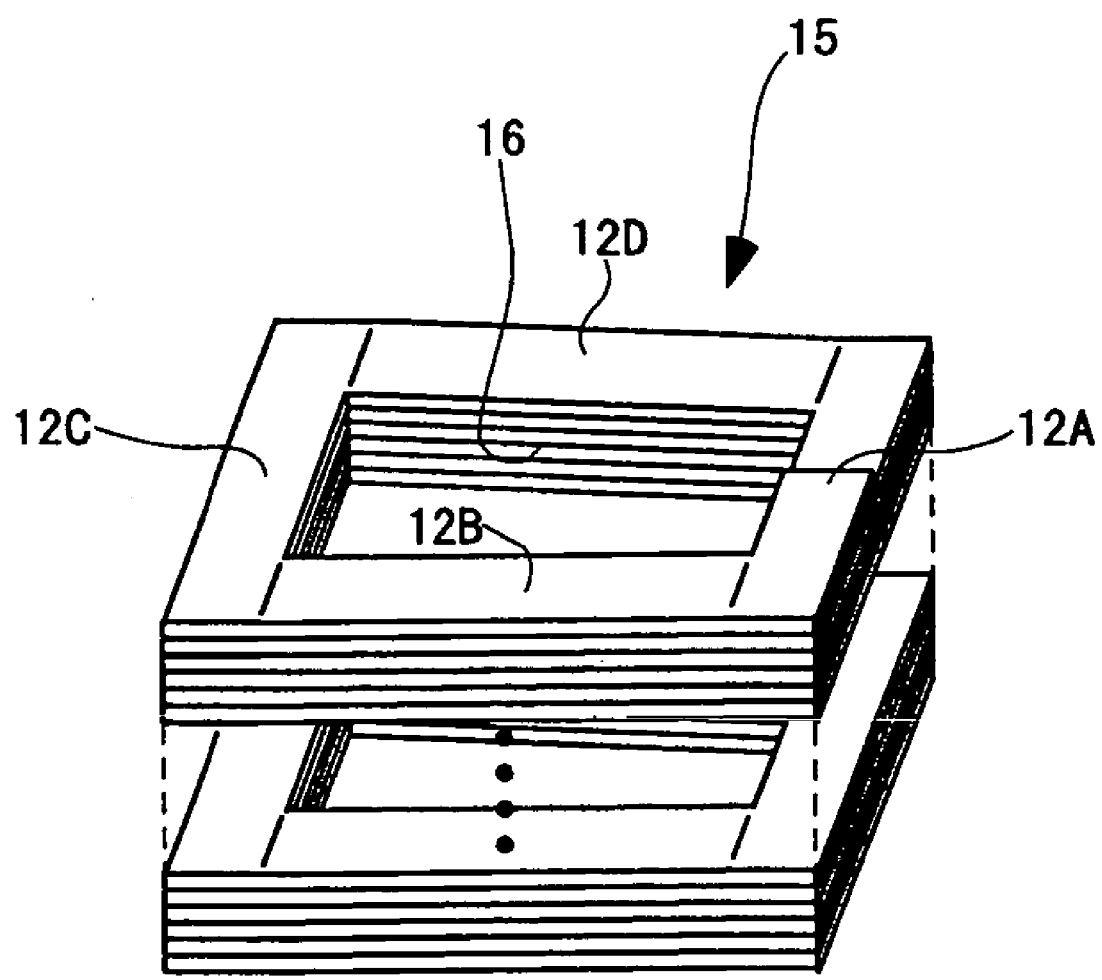
FIG. 10 is a perspective view for schematically illustrating a motor coil molded by a pressure deforming operation.
Figure 11:
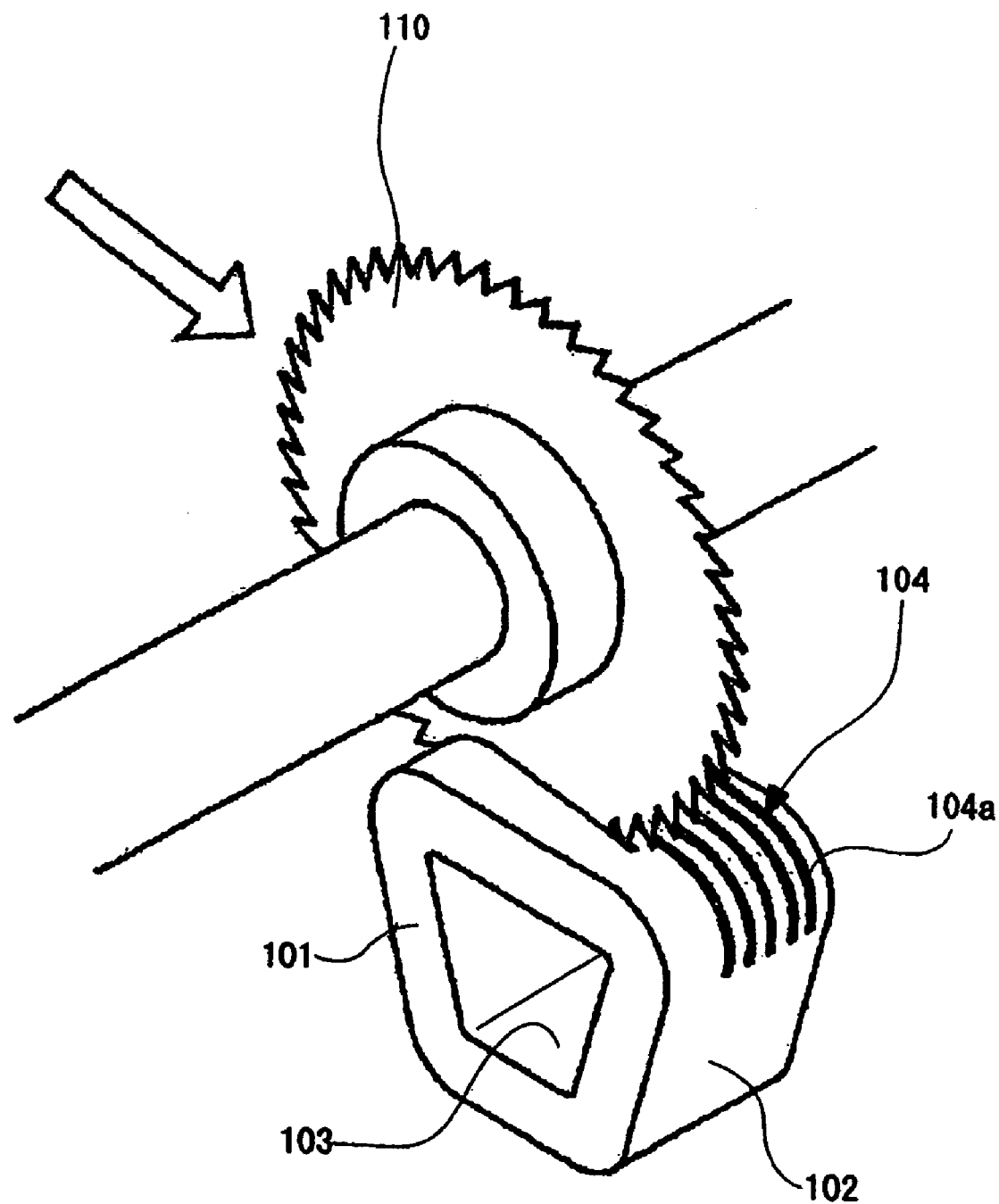
FIG. 11 is a view for explaining conventional technology.
Figure 12:
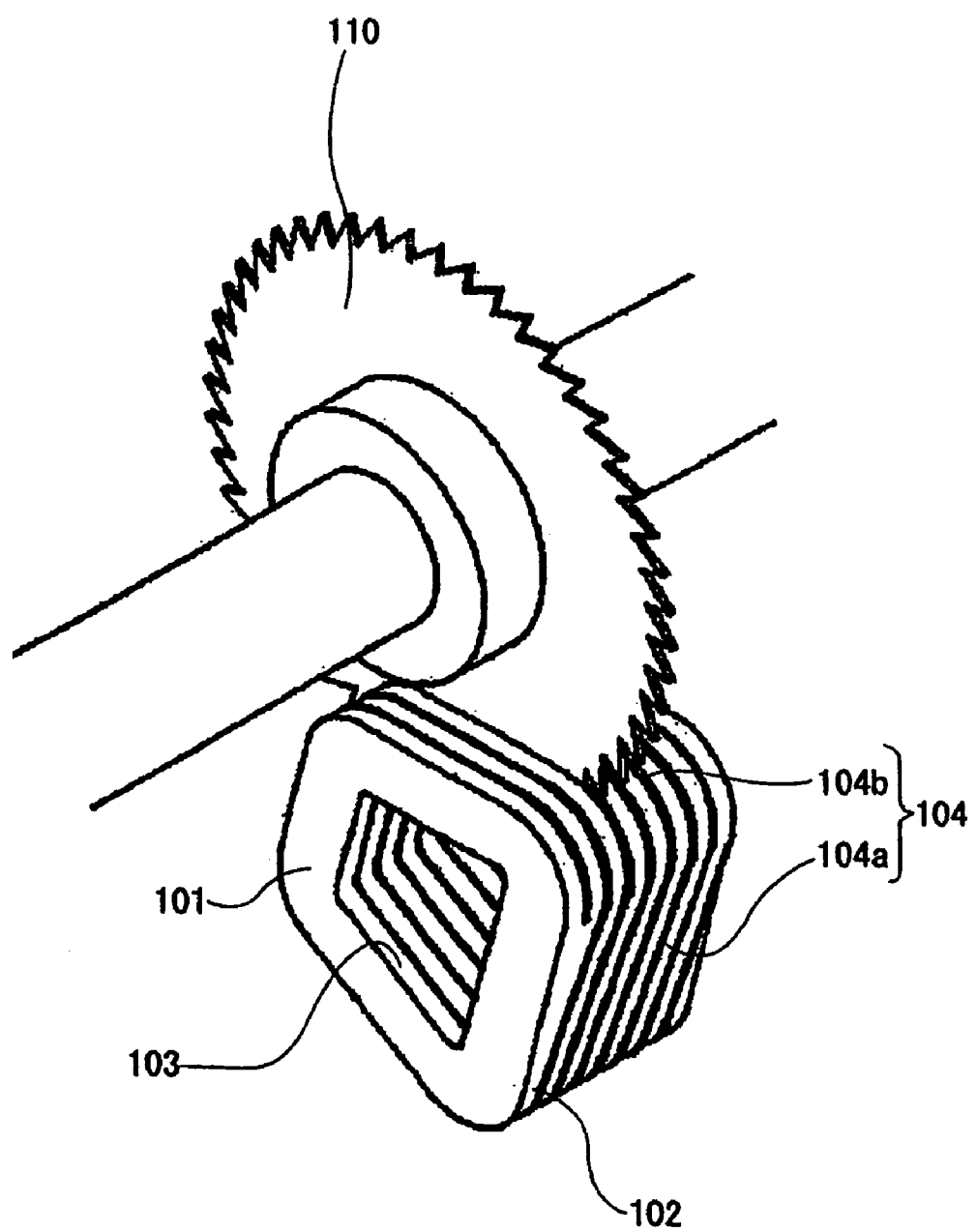
FIG. 12 is a view for explaining conventional technology.

FIG. 10 is a perspective view for schematically illustrating a motor coil molded by a pressure deforming operation. A through hole 16 having a rectangular opening shape capable of inserting a motor core (not shown) is formed on the central portion of the motor coil 15. Further the outer peripheral surface of the motor coil 15 has rectangular shape that can sufficiently fill up a space allowable for design of a motor when the coil is incorporated into the motor.

Hence, the motor coil 15 can have a rectangular shape which is disposed such that a width direction of a ribbon conductor is extended in a radius direction of the motor core and the ribbon conductor is helically superposed on one another in an axis direction of the motor core and along an outer peripheral surface of the motor core. Therefore the motor coil having high space factor can be easily prepared.

While the presently preferred embodiments of the present invention have been shown and described, it is to be understood that disclosures are for the purpose of illustration and that various changes and modification may be made without departing from the scope of the invention as set forth in the appended claims. For example, though the above-mentioned embodiment describes an example of the process for preparing the first molded product 10 by the forging, the first molded product 10 may not be prepared by the forging.

EFFECT OF THE INVENTION

As explained above, according to the process for the preparation of a motor coil and the apparatus for the preparation of the motor coil, a mother material is molded to prepare a first molded product comprising a column part, and a fin part projected in the form of flat plate outward in a radial direction of the column part from an outer peripheral surface of the column part and helically continuing in an axis direction of the column part at predetermined intervals along the outer peripheral surface of the column part. Subsequently, the column part of the first molded product is punched out in an axis direction of the column part with retaining the fin part to remove the column part whereby a second molded product helically formed by the fin part is prepared. Thereafter the second molded product left by the removal is coated with an insulating film to prepare a third molded product. Finally, both sides in a direction punching out the column part of the third molded product is pressurized to be deformed to the third molded product such that adjacent flat plate portions of the fin part are superposed on one another, whereby the motor coil is prepared.

Hence, a longitudinally wound motor coil, so called, in which a width direction of a ribbon conductor is extended in a radius direction of the motor core and the ribbon conductor is helically superposed on one another in an axis direction of the motor core and along an outer peripheral surface of the motor core, can be prepared by the process of the invention. The process makes it possible to easily prepare the longitudinally wound motor coil having high precise dimension, and further enables enhancement of the productivity and reduction of the manufacturing cost.

EXPLANATION OF REFERENCE NUMBER

1: mother material
10: first molded product
11: column part
12: fin part
13: second molded product
14: third molded product
15: motor coil
20: forging apparatus (means for preparing first molded product)
21: bolster
22: pedestal part
26: slide
28: forging punch
30: forging mold
31: upper base
32: lower base
33: plate-shaped block
34b: face 36*b*: face
37: notch part
38: recess part
40: punching apparatus (means for preparing second molded product)
41: bolster
42: pedestal part
46: slide
48: punch
50: punching die
51: upper base
52: lower base
53: plate-shaped block
54*b*: face
56*b*: face
57: notch part
58: recess part
H1: opening hole
H2: punching hole

What is claimed is:

1. A process for the preparation of a motor coil which is penetrated and retained by a column-shaped motor core and which has a ribbon conductor which is disposed such that a width direction of the ribbon conductor is extended in a radius direction of the motor core, the ribbon conductor being helically superposed on one another in an axis direction of the motor core and along an outer peripheral surface of the motor core, comprising:
   a first step for molding a mother material to prepare a first molded product comprising a column part, and a fin part projected in the form of flat plate from an outer peripheral surface of the column part to an outer side in a radial direction of the column part and helically continuing in an axis direction of the column part at predetermined intervals along the outer peripheral surface of column part;
   a second step for punching out the column part from the first molded product in an axis direction of the column part with retaining the fin part to remove the column part to prepare a second molded product helically formed by the fin part;
   a third step for coating the second molded product with an insulating film to prepare a third molded product; and
   a fourth step for pressurizing both sides of the third molded product in a direction having punched out the column part to deform the third molded product such that flat plate portions of the fin part are superposed on one another.

2. An apparatus for the preparation of a motor coil which is penetrated and retained by a column-shaped motor core and which has a ribbon conductor which is disposed such that a width direction of the ribbon conductor is extended in a radius direction of the motor core, the ribbon conductor being helically superposed on one another in an axis direction of the motor core and along an outer peripheral surface of the motor core, comprising:
   a first means for molding a mother material to prepare a first molded product comprising a column part, and a fin part projected in the form of flat plate from an outer peripheral surface of the column part to an outer side in a radial direction of the column part and helically continuing in an axis direction of the column part at predetermined intervals along the outer peripheral surface of column part;
   a second means for punching out the column part from the first molded product in an axis direction of the column part with retaining the fin part to remove the column part to prepare a second molded product helically formed by the fin part;
   a third means for coating the second molded product with an insulating film to prepare a third molded product; and
   a fourth means for pressurizing both sides in a direction punching out the column part of the third molded product to deform the third molded product such that flat plate portions of the fin part are superposed on one another.

3. The apparatus for the preparation of a motor coil as defined in claim 2, wherein the first means comprises:
   a column-shaped space part capable of accommodating the column-shaped mother material in a condition that the material is extended in the longitudinal direction,
   a forging mold having in an interior thereof a fin-shaped space part continued helically along an outer peripheral surface of the column-shaped space part, and
   a forging punch capable of molding the first molded product by pressurizing the mother material charged in the forging mold from the both sides in an axis direction of the mother material.

4. The apparatus for the preparation of a motor coil as defined in claim 3,
   wherein the forging mold has a plurality of plate-shaped blocks having a "U"-shape in a plan view and capable of forming an opening hole extended in the longitudinal direction by combining a pair of the blocks with each other in faces of both sides of the blocks in a right-left arrangement and superposing a plurality of the combined blocks on one another in the longitudinal direction,
   the plate-shaped blocks comprising:
   an upper side part extended approximately horizontally in the direction from the face of one side thereof,
   a lower side part extended approximately horizontally in the direction from the face of the other end thereof in a location under the upper side part,
   an inclined part having two ends linking to the upper side part and the lower side part, continuously extended from the upper side part to the lower side part, while the inclined part gradually descending from the upper side part to the lower side part,
   a notch part formed by notching the face side area of the inclined part in the longitudinal direction, and
   a recess part provided by depressing an upper surface of the plate-shaped block to a predetermined depth from the upper surface and a predetermined width from the notch part continuing from the face of the upper side part to the lower side part along an upper end of the notch part; and
   wherein the plate-shaped blocks are combined right and left with each other in their faces to continuously link an upper surface of the lower side part of one plate-shaped block with an upper surface of the upper side part of the other plate-shaped block and continuously link a lower surface of the upper side part of the one plate-shaped block with an upper surface of the lower side part of the other plate-shaped block, and the column-shaped space part is formed by combining the notches of the plate-shaped blocks, and the fin-shaped space part is formed by combining the recess part of each of the plate-shaped blocks with an under surface of the plate-shaped block superposed on the recess part.

5. The apparatus for the preparation of a motor coil as defined in claim 4,
wherein the second means comprises:
a punching die having a retaining part for retaining the fin part of the first molded product and a punching hole enabling the punching out of the column part of the first molded product in the axis direction, and
a punch for punching out the column part of the first molded product in the axis direction in cooperation with the punching hole of the punching die.

6. The apparatus for the preparation of a motor coil as defined in claim 3, wherein the second means comprises:
a punching die having a retaining part for retaining the fin part of the first molded product and a punching hole enabling the punching out of the column part of the first molded product in the axis direction, and
a punch for punching out the column part of the first molded product in the axis direction in cooperation with the punching hole of the punching die.

7. The apparatus for the preparation of a motor coil as defined in claim 2,
wherein the second means comprises:
a punching die having a retaining part for retaining the fin part of the first molded product and a punching hole enabling the punching out of the column part of the first molded product in the axis direction, and
a punch for punching out the column part of the first molded product in the axis direction in cooperation with the punching hole of the punching die.

8. The apparatus for the preparation of a motor coil as defined in claim 5, wherein the punching die has a plurality of plate-shaped blocks having a "U"-shape in a plan view and capable of forming a punching hole extended in the longitudinal direction by combining a pair of the blocks with each other in faces of both sides of the blocks in a right-left arrangement and superposing a plurality of the combined blocks on one another in longitudinal direction, the plate-shaped blocks comprising:

an upper side part extended approximately horizontally in the direction leaving the face of one end thereof, a lower side part extended approximately horizontally in the direction from the face of the other end thereof in the location under the upper side part, an inclined part having two ends linking to the upper side part and the lower side part, continuously extended from the upper side part to the lower side part, while the inclined part gradually descending from the upper side part to the lower side part, a notch part formed by notching the face side area of the inclined part in the longitudinal direction, and a recess part provided by depressing an upper surface of the plate-shaped block to a predetermined depth from the upper surface and a predetermined width from the notch part continuing from the face of the upper side part to the lower side part along an upper end of the notch part; and wherein the plate-shaped blocks are combined right and left with each other in their faces to continuously link an upper surface of the lower side part of one plate-shaped block with an upper surface of the upper side part of the other plate-shaped block and continuously link a lower surface of the upper side part of the one plate-shaped block with an upper surface of the lower side part of the other plate-shaped block, and the opening hole is formed by using the notches of the plate-shaped blocks, and the retaining part is formed by combining the recess part of each of the plate-shaped blocks with an under surface of the plate-shaped block superposed on the recess part.

* * * * *